United States Patent
Minagawa et al.

(10) Patent No.: US 6,294,251 B1
(45) Date of Patent: *Sep. 25, 2001

(54) COLORED FILM

(75) Inventors: Toshio Minagawa, Wako (JP); Kohei Tachikawa, Woburn, MA (US); Leonardo M. Garcia, Woburn, MA (US); Chandrakant C. Patel, Woburn, MA (US)

(73) Assignee: Lintec Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,778

(22) Filed: Dec. 31, 1998

(30) Foreign Application Priority Data

Jan. 13, 1998 (JP) .................................................. 10-004438

(51) Int. Cl.⁷ .............................. B32B 15/04; B32B 17/10
(52) U.S. Cl. ........................... 428/354; 428/352; 428/430
(58) Field of Search ................................... 428/352, 354, 428/430

(56) References Cited

U.S. PATENT DOCUMENTS

| 3,884,505 | 5/1975 | Miller . |
| 3,887,742 | 6/1975 | Reinnagel . |
| 4,002,593 | * 1/1977 | Jones .................................. 260/40 P |
| 4,797,317 | 1/1989 | Oliver et al. . |
| 5,683,805 | 11/1997 | Oita et al. . |

* cited by examiner

Primary Examiner—Blaine Copenheaver
Assistant Examiner—Christopher C. Pratt
(74) Attorney, Agent, or Firm—Oblon, Spivak, McClelland, Maier & Neustadt, P.C.

(57) ABSTRACT

A colored film is formed of a transparent film and at least one colored adhesive layer colored with at least one coloring agent and provided on at least one side of the transparent film. The colored adhesive layer comprises a polyester resin as an adhesive, and the coloring agent comprises a pigment and a polyester-base dispersant.

14 Claims, 1 Drawing Sheet

COLORED FILM

BACKGROUND OF THE INVENTION

1. Field of the Invention

This invention relates to a colored film, and more specifically to a colored film excellent in vividness, transparency, light resistance, stability and the like.

2. Description of the Related Art

For many years, colored films have been used widely in vehicles, buildings, etc. and also as wrapping materials, display materials and the like. These colored films are used for the purpose of ornamentation, selection of desired incident light wavelengths, prevention of visibility from the outside, or the like, for example, to use them for the purpose of solar control, they are required to have excellent vividness, transparency, light resistance, stability and the like. Further, they are also required to permit easy bonding and pealing. Accordingly, each transparent film is provided on one side thereof with a layer composed of a pressure-sensitive adhesive, a heat-sensitive adhesive or the like. Incidentally, the term "pressure-sensitive adhesive" as used herein should be construed to embrace therein an autohesive (which is a material having no surface tackiness but having a property of being bonded to a smooth surface, such as a glass pane, metal plate, coated surface or plastic plate, by making use of air tightness between the smooth surface and a surface of the autohesive, that is, between these mirror-like surfaces; which will hereinafter be called simply an "autohesive").

For coloration, it has been the conventional practice to use adhesive-soluble dyes in view of the requirement for transparency. Although it is not impossible to color a transparent film itself with a dye, this is very difficult. Coloration is therefore applied primarily to such pressure-sensitive adhesive, heat-sensitive adhesive or curable adhesive.

According to the above-described conventional art, the coloration of an adhesive with a dye is easy, and a colored film excellent in vividness and transparency is available. The colored film is however accompanied by a problem such that, when the colored film is used under conditions where it is exposed to outdoor light like a solar control film, for example, it fades or discolors after an elapse of a certain time as the dye has poor light resistance. With a view to overcoming these problems, a variety of proposals making use of pigments instead of dyes have been made. Such conventional techniques can provide colored films having excellent light resistance, but still cannot furnish color films having satisfactory vividness and transparency because pigments can hardly be dispersed as fine particles in adhesives and, even if dispersed, the thus-dispersed pigment particles tend to undergo considerable aggregation.

SUMMARY OF THE INVENTION

An object of the present invention is therefore to provide a colored film colored with a pigment and having excellent vividness, transparency, light resistance, stability and the like.

To achieve the above-described object, the present invention provides a colored film formed of a transparent film and at least one colored adhesive layer colored with a coloring agent and provided on at least one side of the transparent film. The colored adhesive layer comprises a polyester resin as an adhesive, and the coloring agent comprises a pigment and a polyester-base dispersant.

According to the present invention, the formation of the colored adhesive layer with the particular adhesive and the coloration of the adhesive layer with the specific coloring agent have made it possible to provide the colored film with vividness, transparency, light resistance, stability and the like to such extents as not available at all from the conventional art.

BRIEF DESCRIPTION OF THE DRAWINGS

The present invention will hereinafter be described in further detail with reference to the accompanying drawings, in which.

DETAILED DESCRIPTION OF THE INVENTION AND PREFERRED EMBODIMENTS

Figure 1:
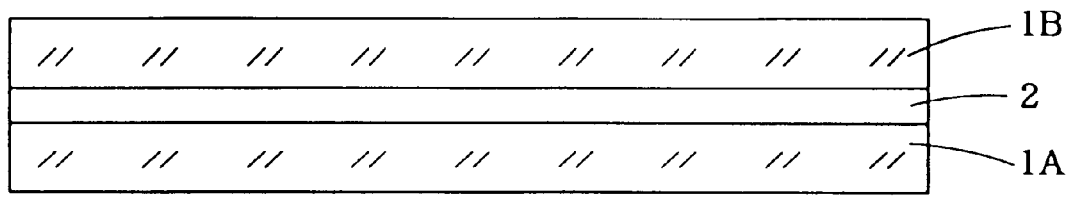
FIG. 1 is a schematic cross-sectional view of a colored film according to a preferred embodiment of the present invention.

The colored film according to the present invention features that, in a colored film formed of a transparent film and at least one colored adhesive layer colored with a coloring agent and provided on at least one side of the transparent film, the colored adhesive layer comprises a polyester resin as an adhesive and the coloring agent comprises a pigment and a polyester-base dispersant.

Usable examples of the transparent film in the present invention can include transparent films employed in conventional colored films, such as polyethylene films, polypropylene film, polyester films, polycarbonate films, polyvinyl chloride films, polyvinylidene chloride films, polystyrene films and polyamide films. No particular limitation is imposed on the sizes of these films. Their thicknesses may vary depending on the application purpose. In general, however, they may be films or sheets of 6 to 200 µm in thickness.

The adhesive employed in the present invention is a polyester-base adhesive, which is known as an adhesive for many years. Conventionally known polyester-base adhesives are all usable in the present invention. No particular limitation is imposed on the adhesive for use in the present invention.

Specific examples of polyester-base adhesives can include polymers, copolymers or the like available from dibasic acids—such as terephthalic acid, isophthalic acid, succinic acid, adipic acid, sebacic acid and dodecanoic acid—and glycols—such as ethylene glycol, propylene glycol, 1,4-butanediol, 1,6-hexanediol, cyclohexanediol, and polyoxyethylene glycol.

As polyester-base adhesives, those available from copolymerization of polyethylene terephthalate or polybutylene terephthalate with dibasic acids such as isophthalic acid, adipic acid and sebacic acid, and with side-chain glycols such as neopentyl glycol or long-chain polyoxyalkylene glycols are used in general. These usable polyester-base adhesives have polymerization degrees of from 3,000 to 20,000 or so and glass transition points not higher than 20° C. In addition, conventionally known polyester-base pressure-sensitive adhesives and polyester-base curable adhesives are also usable.

According to the present invention the colored film can be obtained by coloring the above-described adhesive beforehand with a pigment-type colorant, which will be described subsequently herein, and then applying the resulting colored adhesive onto a transparent film to a predetermined thickness by a suitable coating method.

In the present invention, the dispersant for the pigment, which is formed of a polyester resin, can be the same as the above-described polyester-base adhesive. The above-described polyester-base adhesive and pigment can be kneaded together at such a ratio as containing the pigment at a high concentration, whereby a coloring agent in the form of a master batch can be obtained.

Preferably the polyester-base dispersant is a polyester resin the molecular weight of which is in a range of from about 1,000 to 100,000, notably in a range of from 3,000 to 50,000 in view of the dispersibility of the pigment, the viscosity upon formation into the coloring agent, and the like.

As pigments for use in the present invention, pigments, which have been used conventionally in various fields and are known to the public, are all usable in the present invention. Specific examples can include organic pigments such as phthalocyanine, azo, condensed azo, azo lake, anthraquinone, perylene/perinone, indigo/thioindigo, isoindolinone, azomethineazo, dioxadine, quinacridone, anilineblack, triphenylmethane and carbon black pigments; and inorganic pigments such as titanium oxide, iron oxide, iron hydroxide, chromium oxide, calcined spinel, chromate, chrome vermillion, Prussian blue, aluminum powder and bronze powder pigments. These pigments may be in any forms, and may also be those already subjected to various dispersion treatment by methods known per se in the art.

The coloring agent for use in the present invention can be obtained by kneading the above-described dispersant and the above-described pigment together by a kneader such as a sand grinder mill, ball mill, attritor mill or three-roll mill. Upon kneading, the dispersant may be used in a range of from about 10 to 500 parts by weight per 100 parts by weight of the pigment. Upon kneading the dispersant with the pigment the above-described dispersant (together with a suitable amount of an organic solvent, if necessary) may be added to the pigment in the form of powder and the resulting mixture may then be kneaded, for example, through a three-roll mill. This can provide a coloring agent, which contains aggregated particles of the pigment at a very low aggregation and is excellent in transparency. The thus-obtained coloring agent may be in the form of powder, chips, paste containing an organic solvent, or liquid containing an organic solvent as a medium, and no particular limitation is imposed on its form. It is only necessary to choose a suitable form in accordance with the coloring purpose.

Depending on the material to be colored, the above-described coloring agent may also contain various additives, for example, organic solvents, film-forming resins, flame retardants, oxidation inhibitors, ultraviolet absorbers, plasticizers, surfactants, and the like.

The coloration of the adhesive with the coloring agent can be effected by combining them together in the presence of water or an organic solvent as needed and then thoroughly stirring and mixing them. The above-described coloring agent has property so that it easily and stably disperses in the adhesive (or a solution of the adhesive). Although no special treatment is needed, the dispersion of the pigment can be assured by kneading the mixture of the both components by a kneader such as a sand grinder mill, ball mill, attritor mill or three-roll mill in some instances. The coloring agent can be used in a range of from 0.1 to 10 parts by weight or in terms of the pigment, in a proportion of from 0.1 to 5 parts by weight, both per 100 parts by weight of the adhesive. An unduly low pigment concentration cannot provide sufficient coloring power, while an excessively high pigment concentration may lead to insufficient transparency and light-transmitting property.

The colored films according to the preferred embodiments of the present invention will next be described with reference to the accompanying drawings.

The embodiment shown in FIG. 1 has a colored adhesive (heat-sensitive adhesive, pressure-sensitive adhesive, curable adhesive or the like) layer 2 interposed between two transparent films 1A, 1B. To form the colored adhesive layer 2 by a heat-sealing method, a solution or dispersion of a colored heat-sensitive adhesive is coated on one side of one of the transparent films, namely on one side of the transparent film 1A and is then dried. The other transparent film 1B is then bonded by a laminator such as a heated roller or heated plate. To bond the colored film of this embodiment onto an article, it is necessary to apply a suitable adhesive (which may be either uncolored or colored) onto the transparent film 1A or 1B or onto the article to which the colored film is to be bonded.

Figure 2:
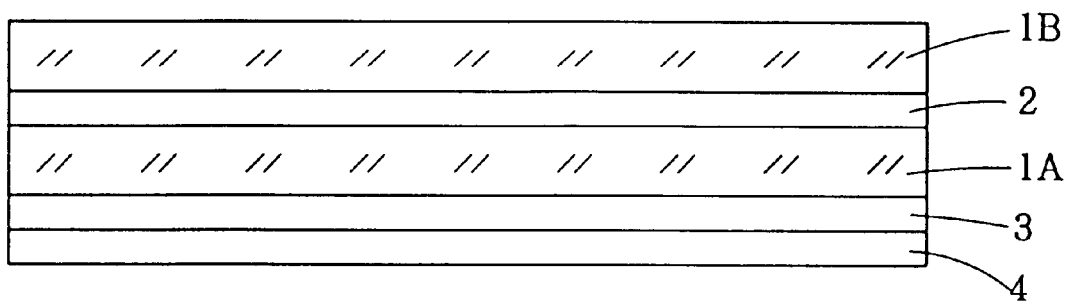
FIG. 2 is a schematic cross-sectional view of a colored film according to another preferred embodiment of the present invention.

The embodiment shown in FIG. 2 is different from the embodiment of FIG. 1 in that a pressure-sensitive adhesive layer 3 is formed on an outer side of the transparent film 1A. The pressure-sensitive adhesive has tackiness at room temperature in this form. To eliminate inconvenience of the tacky pressure-sensitive adhesive, the adhesive layer 3 is provided on an outer side thereof with a release liner 4. The pressure-sensitive adhesive just includes the above-mentioned autohesives. The colored film of this embodiment can be formed in a similar manner as the embodiment illustrated in FIG. 1. It is sufficient for this embodiment if at least one of the adhesive layer 2 and the pressure-sensitive adhesive layer 3 is colored. As a method for using the colored film, for example, when it is desired to apply the above-described colored film onto a glass window of an automotive vehicle, the colored film can be clinged either after or while peeling off the release liner 4 from the surface.

Figure 3:
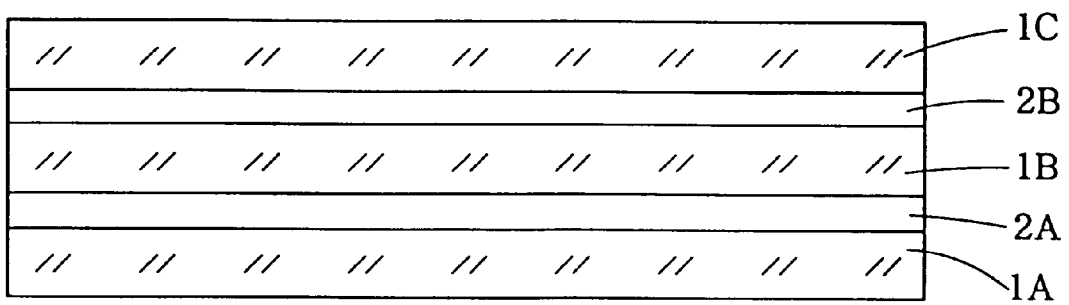
FIG. 3 is a schematic cross-sectional view of a colored film according to a further preferred embodiment of the present invention.

The embodiment depicted in FIG. 3 has two colored adhesive layers 2A, 2B between the three transparent films 1A, 1B, 1C. It is not essential to color both of the adhesive layers, but it is sufficient to color only one of the adhesive layers. The colored film according to this embodiment can be used in the same manner as the embodiment illustrated in FIG. 1.

In each of the above-described embodiments, the shade and light transmittance of the resulting colored film can be controlled as desired. For example, the shade of the coloration can controlled at will by initially providing a colored adhesive of high pigment concentration and then diluting it with an uncolored adhesive of similar composition. As an alternative, a colored film of desired shade can also be obtained by adding the above-described coloring agent as much as needed an uncolored adhesive to obtain a colored adhesive of required shade and then using the colored adhesive.

On the other hand, the light transmittance is also controllable by changing the concentration of the pigment in the colored adhesive layer. When it is desired to obtain, for example, a colored film having low shade and low light-transmitting property, a thin metal deposition layer or the like may be applied to at least one side of a transparent film. When infrared ray reflecting effect is required in addition of coloration irrespective of the shade of the coloration, metal deposition may be applied as described above. In this case, it is preferred to use a metal-deposited film as the transparent film, that is, the starting material. Metal deposition can be applied subsequent to the formation of a colored film. As is evident from the foregoing, the colored film according to the present invention can be obviously provided with other performance or properties as required by combining known techniques.

The coating of the above-described colored adhesive onto the above-described transparent film can be conducted by applying a solution of the colored adhesive in an organic solvent or a dispersion of the same colored adhesive in water, or the like, by using a suitable coating means, for example, a known coater such as a knife-over-roll coater, roll coater, reverse coater or gravure coater and then drying it as needed. As an alternative method, it is also possible to use co-extrusion in which a transparent base film and a colored adhesive are concurrently extruded, or a like method. Further, it is also effective to form a colored adhesive into a film, to remove all volatile components, if any, and then to laminate the thus-formed film of the colored adhesive on a transparent base film.

The colored adhesive may be applied generally to a coating weight of about 1 to 50 $g/m^2$ as measured based on solids. This coating weight should be chosen and determined in view of the concentration of the pigment in the coloring agent so that desired color shade and transparency can be obtained.

When the adhesive is a pressure-sensitive adhesive, it is preferred from the viewpoint of handling ease to provide a release liner, such as a resin film or paper sheet coated with a release silicone, on the surface of a layer of the adhesive.

The present invention will next be described in further detail by Examples and Comparative Examples, in which the designations of "parts" or "part" and "%" are by solid weight unless otherwise specifically indicated.

(Preparation of Coloring Agent 1)

10 parts of a pigment (phthalocyanine green pigment) were mixed with 10 parts of a dispersant (polyester resin; "Vylon 300", trademark; product of Toyobo Co., Ltd.). Subsequent to premixing in a dissolver, the resulting premix was dispersed through a three-roll mill, whereby Coloring Agent 1 was obtained.

(Preparation of Coloring Agent 2)

10 parts of a pigment (phthalocyanine blue pigment) were mixed with 10 parts of a dispersant (polyester resin; "PES-RESIN S310", trademark; product of Takamatsu Oil & Fat Co., Ltd.). Subsequent to premixing in a dissolver, the resulting premix was dispersed through a three-roll mill, whereby Coloring Agent 2 was obtained.

(Preparation of Coloring Agent 3)

Coloring Agent 3 was obtained in a similar manner as in the preparation of Coloring Agent 1 except that the dispersant was replaced by a vinyl-chloride-base dispersant (a copolymer containing 90 parts of vinyl chloride units, 5 parts of vinyl alcohol units and 5 parts of vinyl acetate units).

(Preparation of Coloring Agent 4)

Coloring Agent 4 was obtained in a similar manner as in the preparation of Coloring Agent 2 except that the dispersant was replaced by a vinyl-chloride-base dispersant (the same dispersant as that employed in the preparation of Coloring Agent 3).

EXAMPLE 1

A coating formulation was prepared by mixing 100 parts of a polyester resin ("Vylon 100", trademark; product of Toyobo Co., Ltd. 10 parts of a cross-linking agent ("Colonate L", trademark; product of Nippon Polyurethane Industry Co., Ltd.) and 2 parts of Coloring Agent 1. The coating formulation was coated onto one side of a polyester film of 25 $\mu$m in thickness to give a dry film of coating weight of 3 $g/m^2$. The coating formulation so coated was then dried, whereby a colored adhesive layer was formed.

Through heated laminating rolls (100° C.), a polyester film of 12 $\mu$m in thickness was then laminated on the colored adhesive layer of the film, whereby a colored film according to the present invention was obtained.

EXAMPLE 2

A pressure-sensitive adhesive ("PA-TI", trademark; product of LINTEC Corporation) was coated on the 12 $\mu$m thick polyester film of the colored film, which had been obtained in Example 1, to give a dry film of coating weight of 15 $g/m^2$. The adhesive so coated was then dried, whereby a colored film according to the present invention was obtained.

EXAMPLE 3

A coating formulation of an autohesive, which was formed of 50 parts of a two-pack polyurethane resin ("Leathamine UND-8380", trademark; product of Dainichiseika Color & Chemicals Mfg., Co., Ltd.) and 0.5 part of a polymerization promoter ("Leathamine HI-215", trademark; product of Dainichiseika Color & Chemicals Mfg., Co., Ltd.), was coated on the 12 $\mu$m thick polyester film of the colored film, which had been obtained in Example 1, to give a dry film of coating weight of 10 $g/m^2$. The coating formulation so coated was then dried, whereby a colored film according to the present invention was obtained.

EXAMPLE 4

A colored film according to the present invention was obtained in a similar manner as in Example 1 except that the polyester resin as the adhesive was replaced by "PESRESIN S310" (trademark; product of Takamatsu Oil & Fat Co., Ltd.) and Coloring Agent 1 was replaced by Coloring Agent 2.

COMPARATIVE EXAMPLE 1

A colored film as a comparative example was obtained in a similar manner as in Example 1 except that Coloring Agent 1 was replaced by Coloring Agent 3.

COMPARATIVE EXAMPLE 2

A colored film as a comparative example was obtained in a similar manner as in Example 2 except that Coloring Agent 1 was replaced by Coloring Agent 3.

COMPARATIVE EXAMPLE 3

A colored film as a comparative example was obtained in a similar manner as in Example 4 except that Coloring Agent 2 was replaced by Coloring Agent 4. The colored films of the above Examples and comparative Examples and were each evaluated from the following properties in accordance with the following ranking standards. The evaluation results are shown in Table 1.

1. Transparency

A: Good

B: Relatively good

C: Poor

2. Haze $$\text{Haze} = \frac{\text{Diffused transmittance (\%)}}{\text{Total transmittance (\%)}} \times 100$$

3. Light resistance

A sample of each colored film was exposed to light from a sunshine fadeometer, and a color difference ΔE after an exposure time of 500 hours was measured. Each sample the color difference of which was found to be 2.0 or smaller was determined to be acceptable.

A: Acceptable

B: Unacceptable

TABLE 1

Evaluation Results

|  | Haze | Transparency | Light resistance |
| --- | --- | --- | --- |
| Example 1 | 1.0 | A | A |
| Example 2 | 1.6 | A | A |
| Example 3 | 1.7 | A | A |
| Example 4 | 2.3 | A | A |
| Comp. Ex. 1 | 2.1 | C | A |
| Comp. Ex. 2 | 2.6 | C | A |
| Comp. Ex. 3 | 2.8 | C | A |

As is appreciated from the above results, the colored films according to the present invention are excellent in transparency and light resistance.

The colored films of examples 2 and 3 were clinged to glasses of windows, and then the windows had excellent transparency, light resistance and the like.

This application claims the priority of Japanese Patent application No. HEI 10-004438 filed Jan. 13, 1998, which is incorporated herein by reference.

What is claimed is:

1. A colored film, comprising a transparent film with at least one colored adhesive layer colored with a coloring composition being provided on at least one side of said transparent film, wherein said colored adhesive layer comprises a polyester-based adhesive, and the coloring composition comprises a pigment and a polyester-based dispersant;

wherein said colored adhesive layer comprises 0.1 to 10 parts by weight of said coloring composition per 100 parts by weight of said adhesive.

2. The colored film of claim 1, further comprising a pressure-sensitive adhesive layer formed on an opposite side of said transparent film.

3. The colored film of claim 1, further comprising an additional transparent film laminated on an outer side of the colored adhesive layer.

4. The colored film of claim 3, further comprising a pressure-sensitive adhesive layer formed on an outer side of one of said transparent films.

5. The colored film of claim 4, wherein said the coloring composition comprises 10 to 50 parts by weight of said polyester-based dispersant per 100 parts by weight of said pigment.

6. The colored film of claim 1, which is attached on a window.

7. The colored film of claim 1, wherein said transparent film comprises polyethylene film, polypropylene film, polyester film, polycarbonate film, polyvinyl chloride film, polystyrene film, or polyamide film.

8. The colored film of claim 1, wherein said transparent film has a thickness of 6 to 200 μm.

9. The colored film of claim 1, wherein said polyester-based adhesive has a polymerization degree of from about 3,000 to 20,000, and a glass transition temperature of not higher than 20° C.

10. The colored film of claim 1, wherein said polyester-based adhesive is made from copolymerization of polyethylene terephthalate or polybutylene terephthalate with a dibasic acid and a side-chain glycol.

11. The colored film of claim 1, wherein said dibasic acid comprises isophthalic acid, adipic acid, or sebacic acid.

12. The colored film of claim 11, wherein said side-chain glycol comprises neopentyl glycol or polyoxyalkylene glycols.

13. The colored film of claim 1, wherein said polyester-based dispersant is a polyester resin having a molecular weight of from about 1,000 to 100,000.

14. The colored film of claim 13, wherein said molecular weight is from about 3,000 to 50,000.

* * * * *